US007979182B2

(12) United States Patent
Ooki et al.

(10) Patent No.: US 7,979,182 B2
(45) Date of Patent: Jul. 12, 2011

(54) SWING DRIVE SYSTEM FOR CONSTRUCTION MACHINE

(75) Inventors: Takatoshi Ooki, Kasumigaura (JP); Atsushi Tanaka, Tsuchiura (JP); Yutaka Watanabe, Kasumigaura (JP); Masami Ochiai, Atsugi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 351 days.

(21) Appl. No.: 11/816,346

(22) PCT Filed: Dec. 22, 2006

(86) PCT No.: PCT/JP2006/325659

§ 371 (c)(1), (2), (4) Date: Aug. 15, 2007

(87) PCT Pub. No.: WO2007/088688

PCT Pub. Date: Aug. 9, 2007

(65) Prior Publication Data

US 2009/0055056 A1 Feb. 26, 2009

(30) Foreign Application Priority Data

Feb. 1, 2006 (JP) ................................ 2006-024919

(51) Int. Cl.
*G06F 17/00* (2006.01)

(52) U.S. Cl. ........................................................ 701/50

(58) Field of Classification Search .................... 701/50; 212/255

See application file for complete search history.

(56) References Cited

U.S. PATENT DOCUMENTS 4,555,032 A * 11/1985 Mick et al. .................... 212/302
2010/0213153 A1* 8/2010 Kaiser et al. .................. 212/247

FOREIGN PATENT DOCUMENTS

| | | |
|---|---|---|
| EP | 1 505 717 A1 | 2/2005 |
| JP | 9-142787 A | 6/1997 |
| JP | 2001-011897 | 1/2001 |
| JP | 2002-265187 | 9/2002 |
| JP | 2003-033063 | 1/2003 |

* cited by examiner

*Primary Examiner* — Yonel Beaulieu
(74) *Attorney, Agent, or Firm* — Mattingly & Malur, P.C.

(57) ABSTRACT

A swing drive system for a construction machine enhances safety for an operator. A swing control means 55A has a lever input amount-torque table 11 and an actual rotating speed-torque table 13. Based on a lever input amount and an actual rotating speed of an electric motor, the tables are used to derive torque values. A minimum value of the torque values is taken as the acceleration torque. The swing control means 55A further has a lever input amount-meter-out restriction area table 15 and an actual rotating speed-relief torque table 119. Based on the lever input amount and the actual rotating speed of the electric motor, a meter-out restriction area is derived from the lever input amount-meter-out restriction area table and the actual rotating speed to calculate a meter-out torque. A minimum value of the meter-out torque and relief torque is taken as the braking torque.

5 Claims, 7 Drawing Sheets

SWING DRIVE SYSTEM FOR CONSTRUCTION MACHINE

TECHNICAL FIELD

The present invention relates to a swing drive system for a construction machine and particularly to a swing drive system for a construction machine using an electric motor as an actuator.

BACKGROUND ART

Hydraulic actuators have widely been used in the field of construction machine because the component can be reduced in size and weight irrespective of its output power. The hydraulic actuator has lower energy efficiency than the electric actuator; therefore, mounting the electric actuator has recently been studied. In particular, an actuator that drivingly swings the upperstructure of a construction machine relative to the undercarriage is frequently used and is of a rotary type. Therefore, it is effective to replace the hydraulic actuator with an electric actuator.

A swing drive system using an electric actuator was experimentally manufactured and researched. However, it was revealed that a problem with safety is likely to occur if the swing drive system using the electric actuator is operated in the same manner as the swing drive system using the hydraulic actuator because of a difference in output characteristic between the electric actuator and the hydraulic actuator. Concretely, the following was revealed. The swing drive system using the electric actuator is controlled by a speed command or torque command. When swing is operatively started and then operatively stopped, the swing drive system using the electric actuator controlled by a torque command is not stopped in the same way as the swing drive system using the hydraulic actuator. Thus, the travel distance until the stoppage is great. If so, a front attachment or the like connected to the upperstructure is liable to collide with an obstacle present in the swing direction, lowering safety. On the other hand, the swing drive system using the electric actuator controlled by a speed command is rapidly stopped as compared with the swing drive system using the hydraulic actuator when swing is operatively started and then operatively stopped. If an arm is rapidly stopped, then heavy goods such as stones and rocks put in a bucket may be scattered in some cases, lowering safety.

There is known a swing drive system for a construction machine which controls torque characteristics of an electric actuator during starting and during braking by resembling the hydraulic actuator in torque characteristics during those. In addition, this swing drive system uses the electric motor characteristic of an electric motor during swing acceleration and uses the generator characteristics of the electric motor during swing deceleration. In this way, the swing drive system uses torque characteristics different from each other between during swing acceleration and during swing deceleration (refer to e.g. patent document 1).

Patent Document 1: JP-A-2001-11897

DISCLOSURE OF INVENTION

However, the description in patent document 1 only defines the relationship between the rotating speed and torque of the electric motor during acceleration and during deceleration independently. It does not define the relationship between a command from an input device such as a lever or the like and torque at all. The swing drive system described in patent document 1 is started up at maximum torque when a minute input is applied by the input device such as a lever or the like in the electric motor stop state as well as when a large input is applied. Thus, there arises a problem in that operation intended by an operator cannot be executed.

It is an object of the present invention is to provide a swing drive system for a construction machine which can execute operation intended by an operator and enhances safety.

(1) To achieve the above object, according to the present invention, there is provided a swing drive system for a construction machine including an upperstructure and a undercarriage, the swing drive system swingably driving the upperstructure relative to the undercarriage by using an electric motor as an actuator. The swing drive system includes control means, in response to an input amount of a lever device giving a swing drive command, for calculating acceleration torque and braking torque when a pseudo-swing drive system is composed of a hydraulic pump, a directional control valve and a hydraulic motor, and for taking a difference between the acceleration torque and the braking torque as driving torque of the electric motor.

With such a configuration, operation intended by an operator can be enabled and safety can be enhanced.

(2) In the above (1), preferably, the control means takes an input amount of the lever device and an actual rotating speed of the electric motor as inputs, has a lever input amount-torque table and an actual rotating speed-torque table, and takes a minimum value of torque values derived from the tables as the acceleration torque.

(3) In the above (1), preferably, the control means takes an input amount of the lever device and an actual rotating speed of the electric motor as inputs, has a lever input amount-meter-out restriction area table and an actual rotating speed-relief torque table, calculates meter-out torque by using a meter-out restriction area derived from the lever input amount-meter-out restriction area table and an actual rotating speed of the electric motor, and takes a minimum value of the meter-out torque and the relief torque as the braking torque.

(4) In the above (1), preferably, the control means takes an input amount of the lever device and an actual rotating speed of the electric motor as inputs, has an actual rotating speed-relief torque table, and takes relief torque derived from the actual rotating speed-relief torque table as driving torque when a rotation direction instructed by the input of the lever device is opposite to an actual rotation direction.

(5) In the above (1), preferably, the swing drive system includes an output adjustment dial which can change output, and the control means reduces a value of the acceleration torque in proportion to a command value of the output adjustment dial.

EFFECT OF THE INVENTION

According to the present invention, operation intended by an operator can be enabled and safety can be enhanced.

EXPLANATION OF REFERENCE NUMERALS

Figure 1:
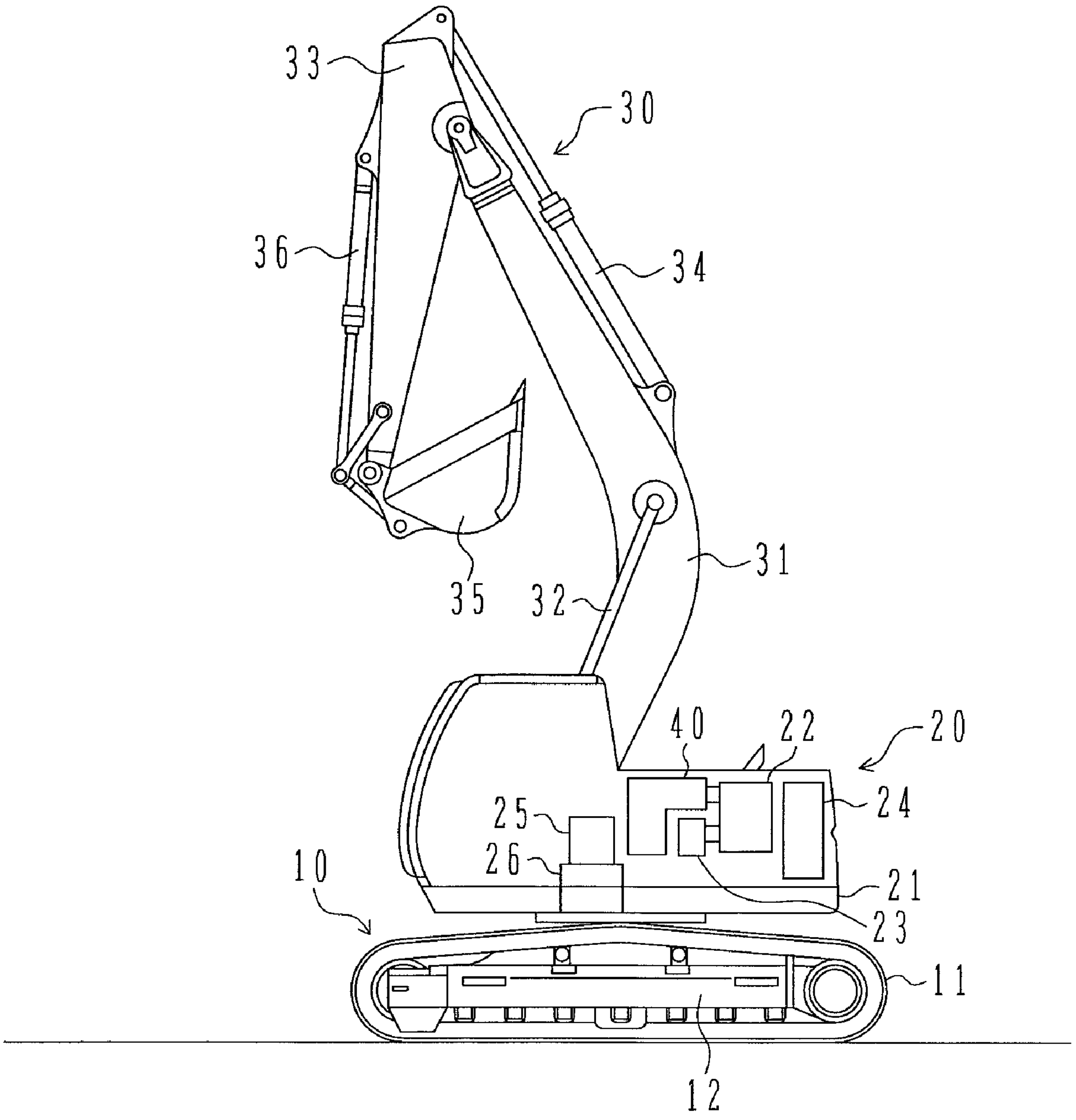
FIG. 1 is a lateral view illustrating configuration of a construction machine using a swing drive system according to a first embodiment of the present invention.

11 Swing operation amount-M/I torque table
13 Actual rotating speed-torque limit table
14 Minimum value selector
15 Swing operation amount-M/O opening table
17 Divider
18 Squarer
19 Proportioner
25 Swing-purpose electric motor
25*s* Rotating speed detector
31 Sign inversion device
32 Reverse lever judging device
42 Maximum dial angle
43 Divider
44 Multiplier
54A Lever device
54B Output adjustment dial
55 Control unit
55A, 55A', 55B Swing control means
110 Actual rotating speed-relief torque table
111 Switch
112 Substitution device

BEST MODE FOR CARRYING OUT THE INVENTION

A description will hereinafter be made of the configuration and operation of a swing drive system for a construction machine according to a first embodiment of the present invention with reference to FIGS. 1 to 5.

A configuration of the construction machine using the swing drive system for a construction machine according to the present embodiment is described with reference to FIG. 1. The construction machine is described taking a excavator as an example.

FIG. 1 is a lateral view illustrating the configuration of the construction machine using the swing drive system according to the first embodiment of the present invention.

A undercarriage 10 includes a pair of crawlers 11 and a pair of crawler frames 12 (one of them is depicted in the figure). The crawlers 11 are independently controllably driven by a pair of respective travel-purpose electric motors 13, 14 described later with FIG. 2, speed-reducing mechanisms therefor and the like.

An upperstructure 20 includes a main frame 21, an engine 22, a generator 23, batteries 24, a swing-purpose electric motor 25 and a swing mechanism 26. The engine 22 serving as a power source is mounted on the main frame 21. The generator 23 is driven by the engine 22. Electric power generated by the generator 23 is stored in the battery 24. The swing-purpose electric motor 25 is driven by electric power from the generator 23 or battery 24 and used as a driving source to swing the upperstructure 20 in a horizontal direction. The swing mechanism 26 includes a speed-reducing mechanism which reduces the rotating speed of the swing-purpose electric motor 25. The swing mechanism 26 is used to swingably drive the upperstructure 20 (the main frame 21) relative to the undercarriage 10 by the dividing force of the swing-purpose electric motor 25.

A front attachment 30 is mounted on the upperstructure 20. The front attachment 30 includes a boom 31 which can be raised and laid, a boom cylinder 32 for driving the boom 31, an arm 33 pivotally supported by the near-tip end of the boom 31, an arm cylinder 34 for driving the arm 33, a bucket 35 pivotally supported by the tip end of the arm 33, and a bucket cylinder 36 for driving the bucket 35. Further, a hydraulic control mechanism 40 is mounted on the main frame 21 of the upperstructure 20. The hydraulic control mechanism 40 includes a hydraulic pump 41 and hydraulic control valves provided for every cylinder for drivingly controlling the boom cylinder 32, arm cylinder 34 and bucket cylinder 36.

Figure 2:
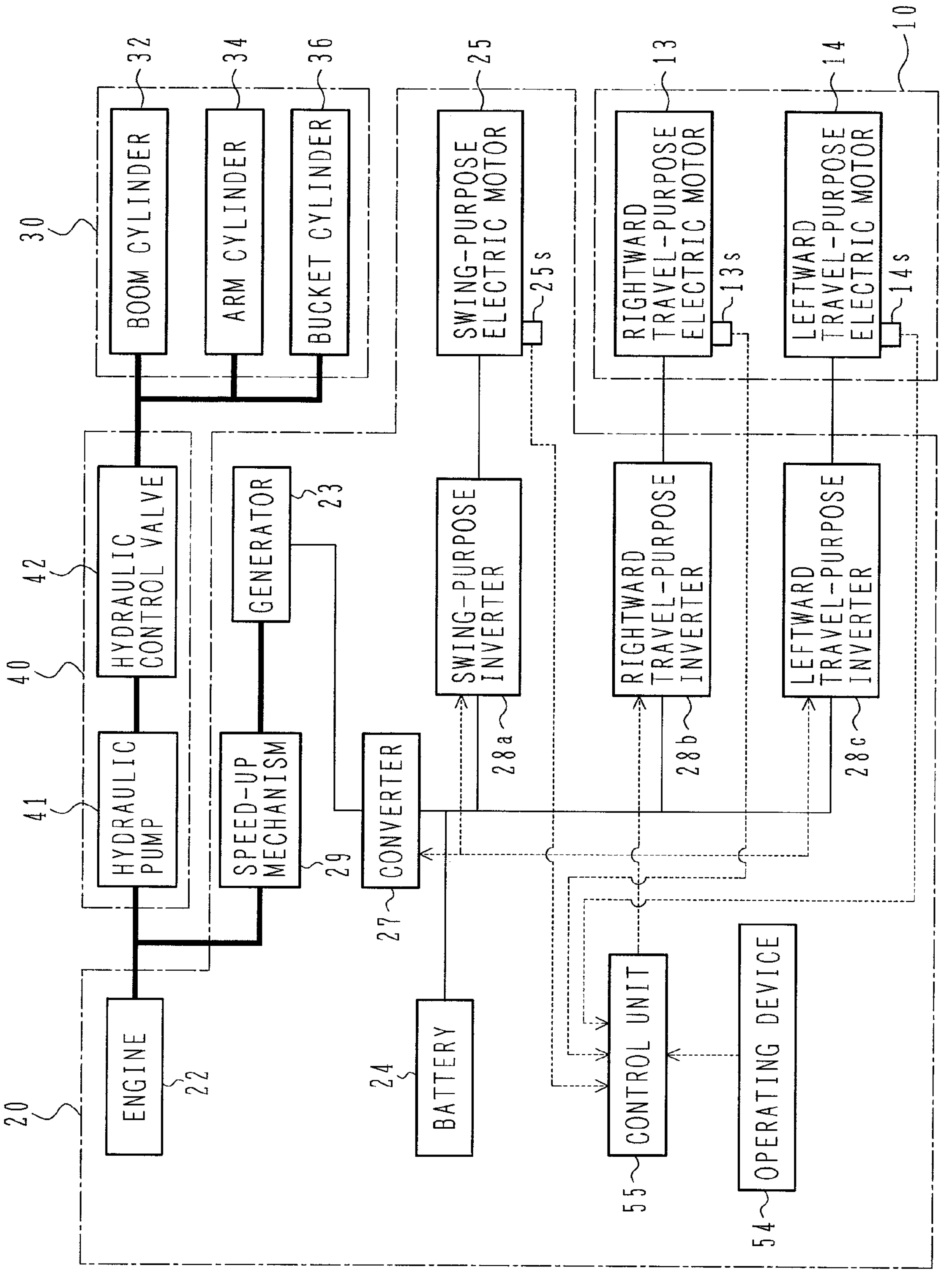
FIG. 2 is a system block diagram illustrating the configuration of a drive control unit of the construction machine including the swing drive system according to the first embodiment of the present invention.

A description is next made of a configuration of a drive control unit of the construction machine including the swing drive system according to the present invention with reference to FIG. 2.

FIG. 2 is a system block diagram illustrating a configuration of the drive control unit of the construction machine including the swing drive system according to the first embodiment of the present invention. In FIG. 2, thick solid lines indicate a mechanical drive system, medium-thick solid lines indicate a hydraulic drive system, thin solid lines indicate electric drive system and dotted lines indicate a control signal system. Reference numerals identical to those of FIG. 1 denote the same portions.

The driving force of the engine 22 is transmitted to the hydraulic pump 41. In response to an operation command from operating means not shown, the hydraulic control valve 42 controls the flow rate and direction of hydraulic fluid fed to the boom cylinder 32, arm cylinder 34 and bucket cylinder 36. The driving force of the engine 22 is transmitted to the generator 23 via a speed increase mechanism 29. The generator 23 generates prescribed AC electric power, which is converted into DC current by a converter 27 and is stored in the battery 24.

On the other hand, DC electric power from the converter 27 or battery 24 is converted into a AC electric power with prescribed voltage and frequency by a swing-purpose inverter 28*a* controlled by a control unit 55, and the electric power is inputted to the swing-purpose electric motor 25. Likewise, DC electric power from the converter 27 or battery 24 is converted into AC electric powers with prescribed voltage and frequency by a rightward traveling inverter 28*b* and a leftward traveling inverter 28*c* controlled by the control unit 55, and the electric power are inputted to the rightward travel-purpose electric motor 13 and to the leftward travel-purpose electric motor 14. The electric motors 13, 14 and 25 are each used on generator characteristics during deceleration so that electric power regenerated by each of the electric power motors 13, 14, 25 is converted into DC electric power, which is stored in the battery 24.

An operating device 54 includes a swing control lever which instructs right-hand and left-hand swings and travel control levers which instructs forward and backward travels. Incidentally, the travel control levers are composed of a rightward travel lever and a leftward travel lever. The swing control lever is usually at a neutral position and is tilted rightward from the neutral position to instruct rightward swing and leftward from the neutral position to instruct leftward swing.

The amount of rightward or leftward tilt from the neutral position is inputted as rightward or leftward swing operation signal to the control unit 55. The travel control lever is usually at a neutral position and is tilted forward from the neutral position to instruct forward movement and backward from the neutral position to instruct backward movement. The amount of forward or backward tilt is inputted as forward or backward movement operation signal to the control unit 55.

The control unit 55 controls, based on the leftward/rightward swing operation signal from the swing control lever of the operating device 54, the voltage and frequency of a AC electric power outputted by the swing-purpose inverter 28*a* so that torque T of the swing-purpose electric motor 25 becomes prescribed torque. The swing-purpose electric motor 25 is equipped with a rotating speed detector 25*s* for detecting the rotating speed of its output shaft. The rotating speed detector 25*s* uses e.g. a resolver. The output signal of the rotating speed detector 25*s* is inputted to the control unit 55. The control unit 55 controls the output torque T of the swing-purpose electric motor 25 in response to the rotating speed N of the swing-purpose electric motor 25 detected by the rotating speed detector 25*s*.

The control unit 55 controls, based on the forward/backward movement operation signal from the travel control lever of the operating device 54, the voltage and frequency of a AC electric power outputted by the rightward and leftward traveling inverters 28*b* and 28*c* so that the torque T of the rightward travel-purpose electric motor 13 or leftward travel-purpose electric motor 14 becomes prescribed torque. The rightward and leftward travel-purpose electric motors 13 and 14 are equipped with rotating speed detector 13*s* and 14*s* for detecting the rotating speeds of their output shafts, respectively. The rotating speed detectors 13*s* and 14*s* use e.g. a resolver. The output signals of the rotating speed detectors 13*s* and 14*s* are inputted to the control unit 55. The control unit 55 controls the output torque T of the rightward and leftward travel-purpose electric motors 13 and 14 in response to the rotating speeds N of the rightward and leftward travel-purpose electric motor 13 and 14 detected by the rotating speed detectors 13*s* and 14*s*, respectively.

In the embodiment described above, the hydraulic pump 41 which drives the boom, arm, and bucket is driven by the engine 22. However, the hydraulic pump 41 may be driven by an electric motor.

The configuration and operation of the swing drive system for the construction machine according to the present embodiment is next described with reference to FIGS. 3 to 5.

Figure 3:
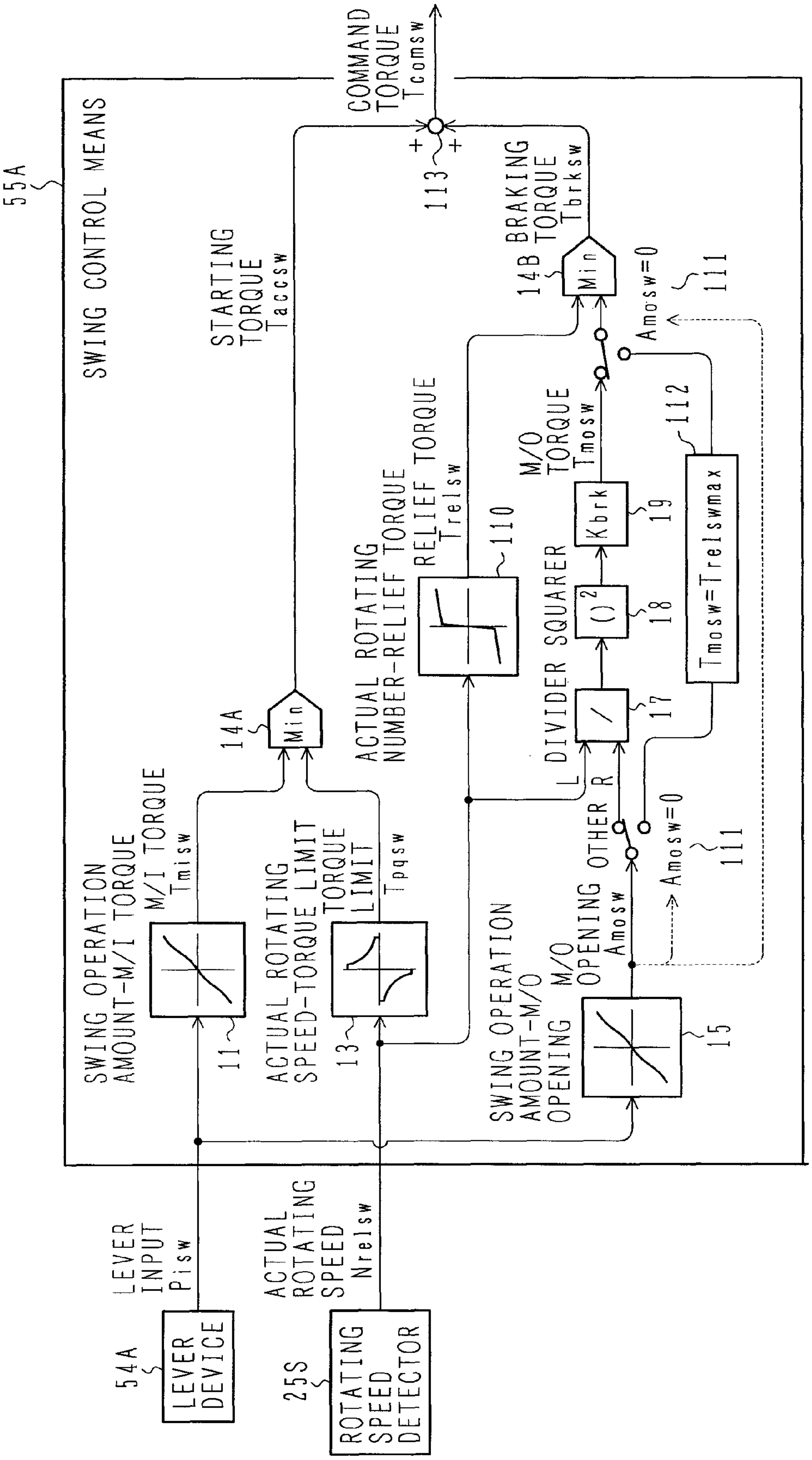
FIG. 3 is a system block diagram illustrating the configuration of the swing drive system according to the first embodiment of the present invention.

FIG. 3 is a system block diagram illustrating the configuration of the swing drive system for the construction machine according to the first embodiment of the present invention. FIG. 4 is a hydraulic circuit diagram of a hydraulic swing drive system for a construction machine by way of example. FIG. 5 includes characteristic diagrams of the hydraulic swing drive system for the construction machine by way of example. It is to be noted that reference numerals identical to those of FIGS. 1 and 2 denote the same portions.

Swing control means 55A, included in the control unit 55 shown in FIG. 2, is control means for exercising swing control. The swing control means 55A receives a lever control input signal Pisw from the swing control lever device 54A in the operating device 54 shown in FIG. 2 and a actual rotating speed signal Nrelsw of the swing-purpose electric motor 25 from the rotating speed detector 25*s* shown in FIG. 2. In addition, the swing control means 55A outputs command torque Tcomsw to the swing-purpose inverter 28*a* shown in FIG. 2. In response to the command torque Tcomsw, the swing-purpose inverter 28*a* controls voltage and current values in converting the output DC electric power of the battery 24 to AC electric power, and supplies AC electric power to the swing-purpose electric motor 25.

Figure 4:
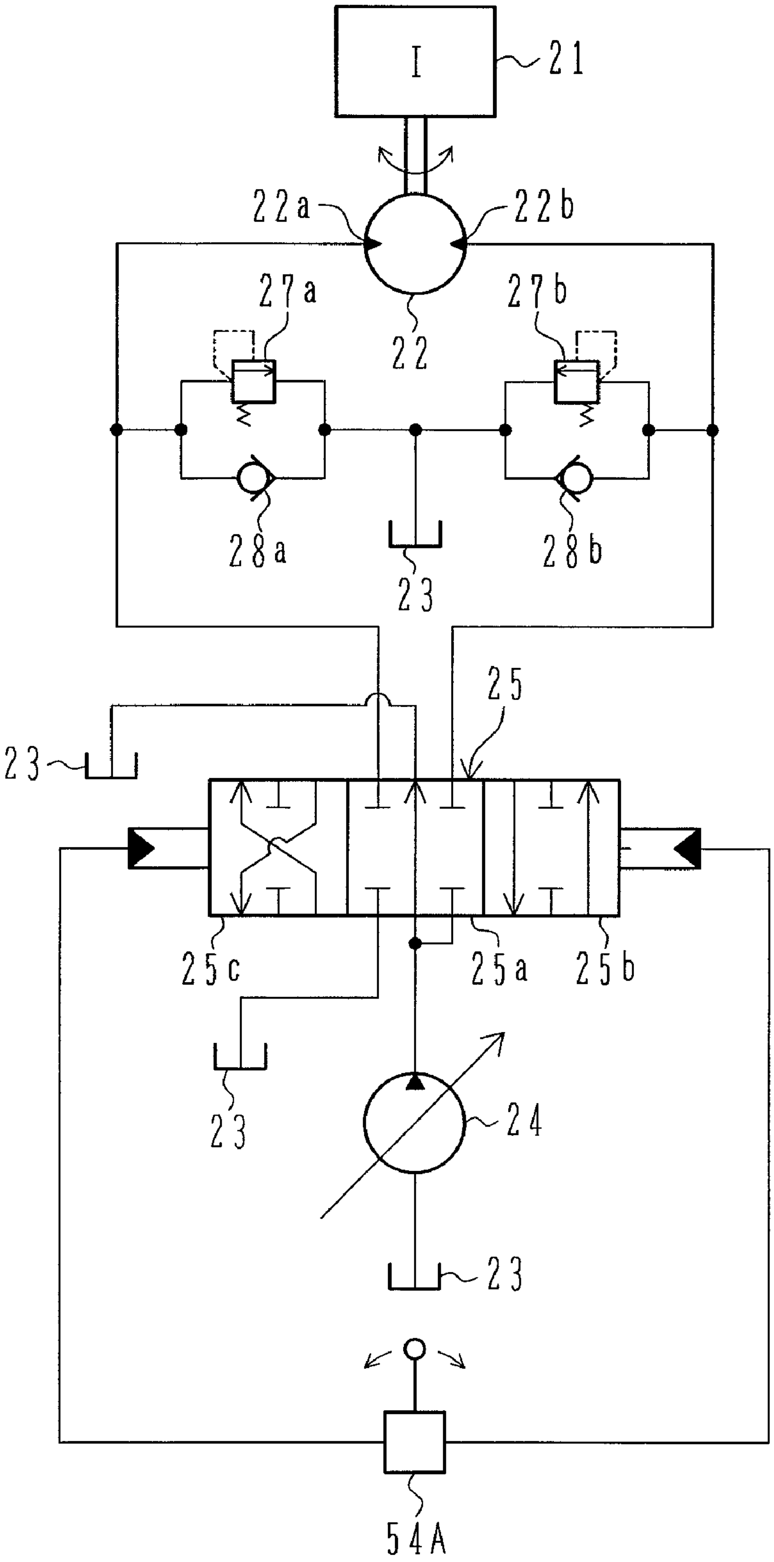
FIG. 4 is a hydraulic circuit diagram of a hydraulic swing drive system for a construction machine by way of example.

A description is here made of a hydraulic swing drive system for a construction machine with reference to a hydraulic diagram of FIG. 4 by way of example.

Referring to FIG. 4, an inertial body 21 representing the upperstructure of the construction machine is swingably driven by a hydraulic swing motor 22. A variable displacement hydraulic pump 24 feeds hydraulic working oil in a hydraulic working oil tank 23 to the swing motor 22. A directional control valve 25 controls the direction and flow rate of the working oil fed to the swing motor 22 from the hydraulic pump 24. The lever device 54A functions as an input device which feeds controlled pressure to the directional control valve 25 to instruct the direction and flow rate of the working oil fed to the swing motor 22. Relief valves 27*a* and 27*b* prescribe the maximum pressures of two ports 22*a* and 22*b*, respectively, adapted to feed/discharge the hydraulic oil of the swing motor 22. Poppet valves 28*a* and 28*b* permits the working oil to flow into the ports 22*a* and 22*b*, respectively, from the working oil tank 23 and prohibits the working oil to flow from the ports 22*a* and 22*b*, respectively, to the working oil tank in order to prevent the two ports 22*a* and 22*b* from being negative pressure ports.

Figure 5A:
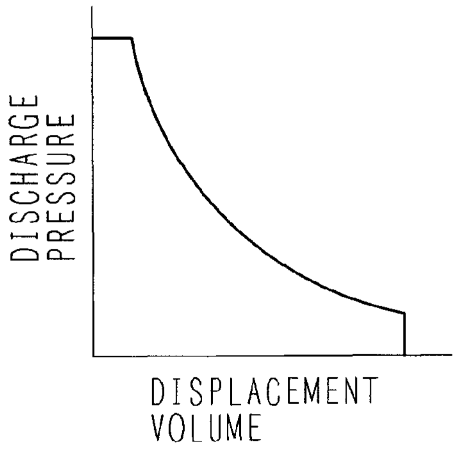
FIGS. 5A-5D include characteristic diagrams of the hydraulic swing drive system for a construction machine by way of example.

To effectively utilize the output power of a driving source not shown, the hydraulic pump 24 has a displacement volume-discharge pressure characteristic as shown in FIG. 5A and is tilt-controlled to provide substantially constant input torque.

When being at a neutral position 25*a* where a pilot command from the lever device 54A is not operated, the directional control valve 25 delivers the full volume of the hydraulic fluid to the working oil tank 23 from the hydraulic pump 24. When the lever device 54A is laid maximally rightward, the directional control valve 25 is switched to a right position 25*b* to lead the hydraulic fluid from the hydraulic pump 24 to the port 22*b* of the swing motor 22. The hydraulic fluid is then discharged from the port 22*a* and returned to the working oil tank 23 via the directional control valve 25. When the lever device 54A is laid maximally leftward, the directional control valve 25 is switched to a left position 25*c* to lead the hydraulic fluid from the hydraulic pump 24 to the port 22*a* of the swing motor 22. The hydraulic fluid is then discharged from the port 22*b* and returned to the working oil tank 23 via the directional control valve 25.

When the lever device 54A is rightward laid to a half position, the directional control valve 25 is switched to an intermediate position between the neutral position 25*a* and the right position 25*b*. In this state, both a hydraulic line communicating from the hydraulic pump 24 at the neutral position 25*a* to the working oil tank 23 and a hydraulic line from the hydraulic pump 24 at the right position 25*b* to the swing motor 22 are restricted. In such a state, in response to the command value of the lever device 54A, the pump delivery pressure is prescribed according to the lever command-maximum pressure characteristic shown in FIG. 5B. This pump delivery pressure is pressure Pb at the port 22*b* of the swing motor 22. Likewise, when the lever device 54A is leftward laid to a half position, the pressure Pa at the port 22*a* of the swing motor 22 can be determined.

Figure 5C:
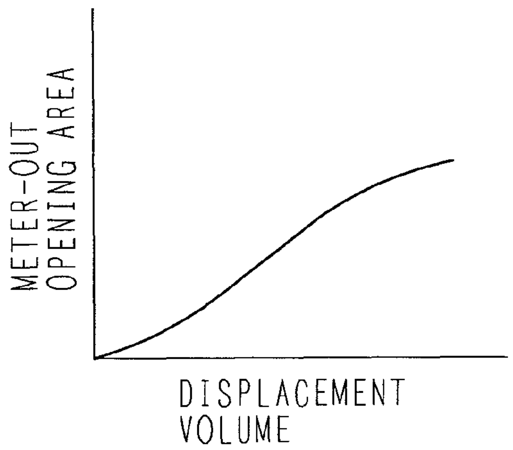
Figure 5B:
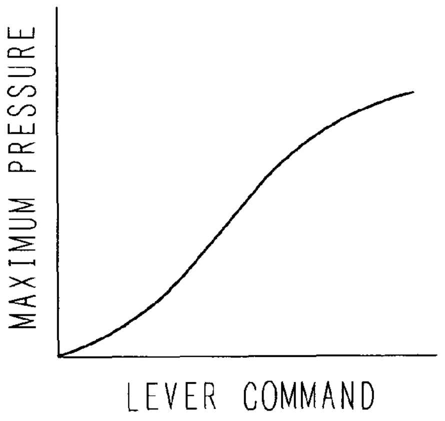

It is apparent from the above that the pressure of the hydraulic pump 24 which powers the swing motor 22 is a minimum value selected from the pump delivery pressure determined from the flow rate through FIG. 5A and the maximum pressure obtained from the lever command through FIG. 5B.

On the other hand, when the lever device 54A is laid rightward, the relationship shown in FIG. 5C occurs between the lever command value and an opening area, at the right position 25*b* of the directional control valve 25, of a hydraulic line (meter-out hydraulic line) communicating the swing motor 22 with the working oil tank 23. This holds true for the case where the lever device 54*a* is laid leftward.

Figure 5D:
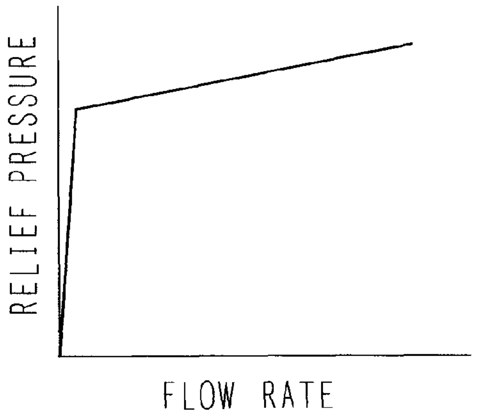

The relief valves 27*a* and 27*b* have a flow rate-pressure characteristic shown in FIG. 5D. Thus, the maximum value of pressure at the port 22*a* of the flow motor 22 for a specific flow rate is prescribed by FIG. 5D.

In the state where the lever device 54A is laid rightward to drive the swing motor 22, when the lever device 54A is moved to the neutral direction, pressure P can be determined from the following equation (1):

$$P=\alpha(Q/A)^2 \quad (1)$$

where Q is a flow rate generated by the rotation of the swing motor 22, A is the opening area of the meter-out hydraulic line obtained by FIG. 5C and α is constant. The smaller value of the pressure P thus determined and the relief pressure Pmax obtained from the flow rate Q depending on FIG. 5D is pressure generated at the port 22*a* of the swing motor 22. In the state where the lever device 54A is laid leftward to drive the swing motor 22, when the lever device 54A is moved to the neutral direction, pressure Pb at the port 22*b* of the swing motor 22 can be determined in the same way as above.

The output torque of the swing motor 22 can be seen from the differential pressure between the respective pressures Pa, Pb of the ports 22*a*, 22*b* of the swing motor 22 obtained as above and the displacement volume of the motor 22.

A description is next made of the configuration and operation of the swing drive system for the construction machine according to the present embodiment with reference to FIG. 3.

In the present embodiment, following the procedure for deriving the respective pressures Pa, Pb at the ports 22*a*, 22*b* of the swing motor 22 with FIGS. 4 and 5, the swing control means 55A computes acceleration torque Taccsw and braking torque Tbrksw and then computes command torque Tcomsw, based on the acceleration torque and braking torque, like deriving the output torque of the swing motor 22 from the differential pressure between the pressures Pa, Pb.

The swing control means 55A includes a swing operation amount-meter-in (M/I) torque table 11 corresponding to FIG. 5B; an actual rotating speed-torque limit table 13 corresponding to FIG. 5A; a swing operation amount-meter-out (M/O) opening table 15 corresponding to FIG. 5C; an actual rotating speed-relief torque table 110 corresponding to FIG. 5D; minimum value selectors 14A, 14B; a divider 17; a squarer 18; a proportioner 19; a switch 111; a substitution device 112; and an adder 113.

The arithmetic processing for acceleration torque Taccsw is first described. The swing control means 55A derives M/I torque Tmisw from the lever input Pisw from the lever device 54A by using the swing operation amount-meter-in (M/I) torque table 11 corresponding to FIG. 5B. In addition, the swing control means 55A derives a torque limit value Tpqsw from the actual rotating speed Nrelsw from the rotating speed detector 25*s* of the electric motor by using the actual rotating speed-torque limit table 13 corresponding to FIG. 5A. A minimum value selector 14 selects the minimum value from the M/I torque Tmisw and the torque limit value Tpqsw to provide the acceleration torque Taccsw of the electric motor.

The arithmetic processing for braking torque Tbrksw is next described. The swing control means 55A derives M/O opening Amosw from the lever input Pisw from the lever device 54A by using the swing operation amount-meter-out (M/O) opening table 15 corresponding to FIG. 5C. To execute computation corresponding to equation (1), the swing control means 55A calculates M/O torque Tmosw from the M/O opening Amosw and the actual rotating speed Nrelsw from the rotating speed detector 25*s* of the electric motor by using the divider 17, squarer 18 and proportion device 19.

The swing control means 55A derives relief torque Trelsw from the actual rotating speed Nrelsw from the rotating speed detector 25*s* of the electric motor by using the actual rotating speed-relief torque table 110 corresponding to FIG. 5D. The minimum value selector 14 selects the minimum value from the M/O torque Tmosw and the relief torque Trelsw to provide the braking torque Tbrksw of the electric motor.

However, when the lever device 54A is returned to the neutral position, the M/O opening Amosw derived from the swing operation amount–M/O opening table 15 becomes zero, which disadvantageously produces zero-division in the divider 17. To avoid this disadvantage, only when the M/O opening is zero, switches 111 are used to bypass the divider 17, squarer 18 and proportioner 19 and the substitution device 112 installed is used to provide Tmosw=Trelswmax. The set value Trelswmax shall be a value greater than the maximum value of the relief torque Trelsw derived from the actual rotating speed-relief torque table 110.

With this procedure described above, braking torque Trelswmax=relief torque Trelsw can be provided at any time when lever operation amount Pisw=0.

Further the subtractor 113 is used to provide a difference between the acceleration torque Taccsw and braking torque Tbrksw of the electric motor, that is, to calculate command torque Tcomsw, which is outputted to the swing-purpose inverter 28*a*.

With the configuration according to the present embodiment described above, the construction machine that uses an electric motor as an actuator to swingably drive the upperstructure relative to the undercarriage can provide the same operational feeling as that of the hydraulic swing drive system. Thus, even if an operator performs swing-drive operation in the same manner as the hydraulic swing drive system, swing operation can be done in the same manner as that of the hydraulic swing drive system. Over-shooting movement of the upperstructure including a front attachment can be prevented and also sudden stopping of the upperstructure can be prevented, enhancing safety. In addition, an operator who has changed from the construction machine equipped with a hydraulic swing drive system can operate the construction machine using the electric motor as an actuator without discomfort.

Incidentally, for simplification of the above description, the swinging direction is positive. However, actual computation is done taking into consideration leftward and rightward swing directions.

Figure 6:
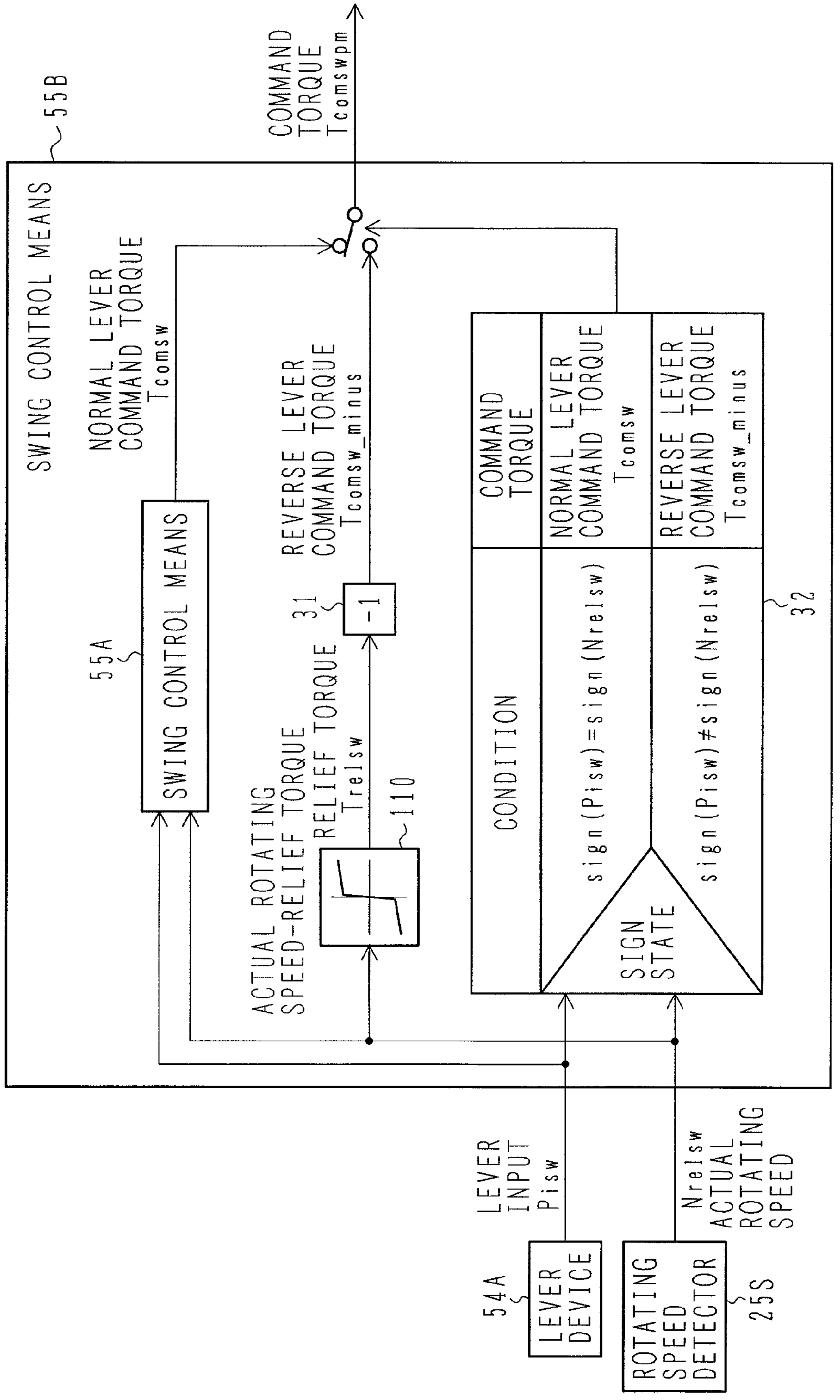
FIG. 6 is a system block diagram illustrating the configuration of a swing drive system for the construction machine according to a second embodiment.

A description is next made of the configuration and operation of a swing drive system for a construction machine according to a second embodiment of the present invention with reference to FIG. 6. The configuration of the construction machine of the present embodiment is the same as shown in FIG. 1. In addition, the configuration of the drive control device of the construction machine including the swing drive system according to the present embodiment is the same as shown in FIG. 2.

FIG. 6 is a system block diagram illustrating the configuration of a swing drive system for the construction machine according to the second embodiment. Note that the same reference numerals as in FIGS. 1 to 3 denote the same portions.

Swing control means 55B, included in the control unit 55 shown in FIG. 2, is control means for exercising swing control. The swing control means 55B receives a lever control input signal Pisw from the swing control lever device 54A in the operating device 54 shown in FIG. 2 and a actual rotating speed signal Nrelsw of the swing-purpose electric motor 25 from the rotating speed detector 25*s* shown in FIG. 2. In addition, the swing control means 55B outputs command torque Tcomswpm to the swing-purpose inverter 28*a* shown in FIG. 2. In response to the command torque Tcomswpm the swing-torque inverter 28*a* controls voltage and current values in converting the output DC electric power of the battery 24 to AC electric power, and supplies AC electric power to the swing-purpose electric motor 25.

When the lever device 54A shown in FIG. 4 is quickly switched from the rightward direction to the leftward direction, the swing motor 22 is rotated so that the inertia of the inertial body 21 causes hydraulic working oil to flow from the port 22*b* to the port 22*a*. In this case, since the directional control valve 25 is at the left position 25*c*, hydraulic fluid discharged from the hydraulic pump 24 is led to the port 22*a* of the swing motor 22. At this time, the hydraulic fluid passing the swing motor 22 flows from the working oil tank 23, through the check valve 28*b*, swing motor 22, and relief valve 27*a* to the working oil tank 23. In addition, the hydraulic fluid discharged from the hydraulic pump 24 flows from the directional control valve 25 through the relief valve 27*a* to working oil tank 23.

Accordingly, if the command direction of the lever device 54A is direct opposite to the rotational direction of the swing motor 22, torque generated by the swing motor 22 depends on the characteristics of the relief valves 27*a* and 27*b*.

The swing control means 55B includes the swing control means 55A described with FIG. 3; the actual rotating speed-relief torque table 110 corresponding to FIG. 5D; a sign inversion device 31; and a reverse lever judging device 32. The command torque Tcomsw outputted by the swing control means 55A is here called normal lever command torque.

The swing control means 55A calculates normal lever command torque Tcomsw as described with FIG. 3.

On the other hand, the swing control means 55B calculates the relief torque Trelsw from the actual rotating speed Nrelsw from the rotating speed detector 25*s* of the electric motor by using the actual rotating speed-relief torque table 110. Then, the swing control means 55B uses the sign inversion device 31 to invert the sign of the relief torque Trelsw and calculates reverse lever command torque Tcomsw.minus.

The reverse lever judging device 32 judges, based on the lever input Pisw from the lever device 54A and the actual rotating speed Nrelsw from the rotating speed detector 25*s*, whether or not the sign of the lever input Pisw is the same as that of the actual rotating speed Nrelsw. If they are the same, the judgment is made as the normal lever. If they are different from each other, the judgment is made as the reverse lever. For the normal lever, the reverse lever judging device 32 calculates, as the command torque Tcomswpm, the normal lever command torque Tcomsw calculated by the swing control means 55A and outputs it to the swing inverter 28*a*. For the reverse lever, the reverse lever judging device 32 calculates, as the command torque Tcomswpm, the reverse lever command torque Tcomsw.minus calculated by the actual rotating speed-relief torque table 110 and sign inversion device 31 and outputs it to the swing-purpose inverter 28*a*.

With the configuration according to the present embodiment described above, even if an operator performs swing-drive operation in the same manner as the hydraulic swing drive system, swing operation can be done in the same manner as that of the hydraulic swing drive system. Over-shooting movement of the upperstructure including a front attachment can be prevented and also sudden stopping of the upperstructure can be prevented, enhancing safety. In addition, an operator who has changed from the construction machine equipped with a hydraulic swing drive system can operate the construction machine using the electric motor as an actuator without discomfort.

Further even when the lever input command of the lever device is opposite in direction to the actual rotating speed of the electric motor (the reverse lever), the operator can obtain the operational feeling comparable to that of the hydraulic swing drive system. An operator who has changed from the construction machine equipped with a hydraulic swing drive system can operate the construction machine using the electric motor as an actuator without discomfort.

Figure 7:
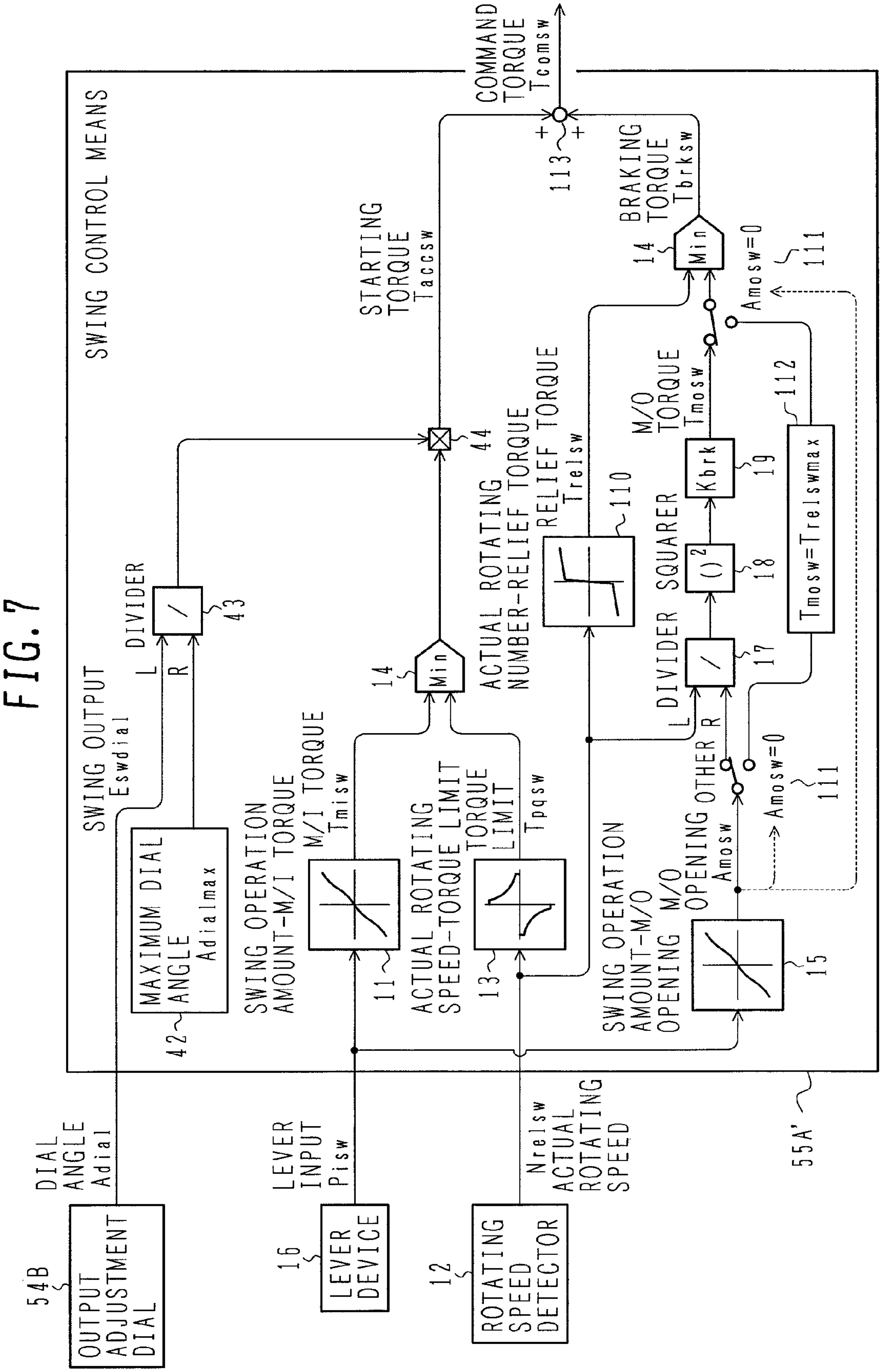
FIG. 7 is a system block diagram illustrating the configuration of a swing drive system for the construction machine according to a third embodiment.

A description is next made of the configuration and operation of a swing drive system for a construction machine according to a third embodiment of the present invention with reference to FIG. 7. The configuration of the construction machine of the present embodiment is the same as shown in FIG. 1. In addition, the configuration of the drive control unit of the construction machine including the swing drive system according to the present embodiment is the same as shown in FIG. 2.

FIG. 7 is a system block diagram illustrating the configuration of a swing drive system for the construction machine according to the third embodiment. Note that the same reference numerals as in FIGS. 1 to 3 denote the same portions.

Swing control means 55A', included in the control unit 55 shown in FIG. 2, is control means which exercises swing control. The swing control means 55A' includes a maximum dial angle output device 42, a divider 43 and a multiplier 44 in addition to the configuration of the swing control means 55A shown in FIG. 3.

An output adjustment dial 54B is included in the operating device 54 and is operated by an operator to output an optionally set dial angle Adial.

The divider 43 divides a dial angle Adial set by the output adjustment dial 54B by the maximum dial angle Adialmax set by the maximum dial angle output device 42 to output a factor not greater than 1. The multiplier 44 multiplies the selection result of the minimum value selector 14 by the calculation result factor of the divider 43 and outputs the acceleration torque Taccsw as the calculation result.

The command torque Tcomsw can be changed by the operator adjusting the output adjustment dial 54B, which consequently provides swing operation meeting the operator's choice.

With the configuration according to the present embodiment described above, even if an operator performs swing-drive operation in the same manner as the hydraulic swing drive system, swing operation can be done in the same manner as that of the hydraulic swing drive system. Over-shooting movement of the upperstructure including a front attachment can be prevented and also sudden stopping of the upperstructure can be prevented, enhancing safety. In addition, an operator who has changed from the construction machine equipped with a hydraulic swing drive system can operate the construction machine using the electric motor as an actuator without discomfort.

Further, the swing operation that meets the operator's choice in response to the command of the output adjustment dial can be provided.

Incidentally, the above description has made of the swing drive system for the construction machine; however, the invention is not limited to this and the following modification can be made. For example, the invention is applied to a travel drive system instead of the swing drive system. The present invention is not limited to the configurations of the embodiments described above unless the characteristic functions of the invention are impaired.

The invention claimed is;

1. A swing drive system for a construction machine for swingably driving an upperstructure relative to an undercarriage by using an electric motor as an actuator, the swing drive system comprising:

a drive control unit which, in response to an input amount of a lever device giving a swing drive command, calculates acceleration torque and braking torque when a pseudo-swing drive system is composed of a hydraulic pump, a directional control valve and a hydraulic motor, and takes a difference between the acceleration torque and the braking torque as driving torque of said electric motor.

2. The swing drive system for a construction machine according to claim 1, wherein said drive control unit:

takes an input amount of the lever device and an actual rotating speed of said electric motor as inputs, comprises a lever input amount-torque table and an actual rotating speed-torque table, and takes a minimum value of torque values derived from said tables as the acceleration torque.

3. The swing drive system for a construction machine according to claim 1, wherein said drive control unit:

takes an input amount of the lever device and an actual rotating speed of said electric motor as inputs, has a lever input amount-meter-out restriction area table and an actual rotating speed-relief torque table, calculates meter-out torque by using by using a meter-out restriction area derived from the lever input amount-meter-out restriction area table and an actual rotating speed of the electric motor, and takes a minimum value of the meter-out torque and the relief torque as the braking torque.

4. The swing drive system for a construction machine according to claim 1, wherein said drive control unit:

takes an input amount of the lever device and an actual rotating speed of said electric motor as inputs, has an actual rotating speed-relief torque table, and takes relief torque derived from the actual rotating speed-relief torque table as the driving torque when a rotation direction instructed by the input of the lever device is opposite to an actual rotation direction.

5. The swing drive system for a construction machine according to claim 1, comprising an output adjustment dial which can change output, wherein said drive control unit reduces a value of the acceleration torque in proportion to a command value of the output adjustment dial.

* * * * *